United States Patent [19]

Lieber

[11] 4,056,330

[45] Nov. 1, 1977

[54] METHOD FOR ADJUSTING THE OUTPUT OF A PUMP PROVIDED WITH AN ADJUSTABLE SPRAY CONE WITH MOVABLE BLADES

[75] Inventor: Jean Lieber, Geneva, Switzerland

[73] Assignee: Ateliers des Charmilles S.A., Geneva, Switzerland

[21] Appl. No.: 617,798

[22] Filed: Sept. 29, 1975

[30] Foreign Application Priority Data

Oct. 3, 1974 Switzerland ................... 13293/74

[51] Int. Cl.² ........................................... F01D 21/00
[52] U.S. Cl. .................................... 415/1; 415/155; 415/158; 415/500
[58] Field of Search ................... 415/1, 149, 155, 158, 415/163, 500

[56] References Cited

U.S. PATENT DOCUMENTS

| 1,322,810 | 11/1919 | Moody | 415/158 |
| 1,723,254 | 8/1929 | Popp | 415/158 |
| 2,671,635 | 3/1954 | Willi | 415/163 |
| 2,687,280 | 8/1954 | Sharp | 415/500 |
| 2,996,995 | 8/1961 | Culaud | 415/155 |
| 3,196,798 | 7/1965 | Coucet et al. | 415/155 |
| 3,228,656 | 1/1966 | Kyogoku | 415/158 |
| 3,489,391 | 1/1970 | Kanger et al. | 415/158 |
| 3,494,704 | 2/1970 | Culaud et al. | 415/158 |

FOREIGN PATENT DOCUMENTS

| 1,270,556 | 7/1961 | France | 415/158 |
| 1,319,041 | 1/1963 | France | 415/158 |
| 126,520 | 1/1902 | Germany | 415/162 |

*Primary Examiner*—C. J. Husar
*Attorney, Agent, or Firm*—Emory L. Groff, Jr.

[57] ABSTRACT

In a hydraulic pump and turbine system, the angular setting of the spray cone blades of the pump can be adjusted without any detrimental vibratory action during actual operation of the pump, this being obtained by closing, during said adjustment and without stopping the movement of the pump rotor, a valve, preferably a sleeve valve, inserted in the pump delivery channel between the pump rotor and the spray cone.

1 Claim, 1 Drawing Figure

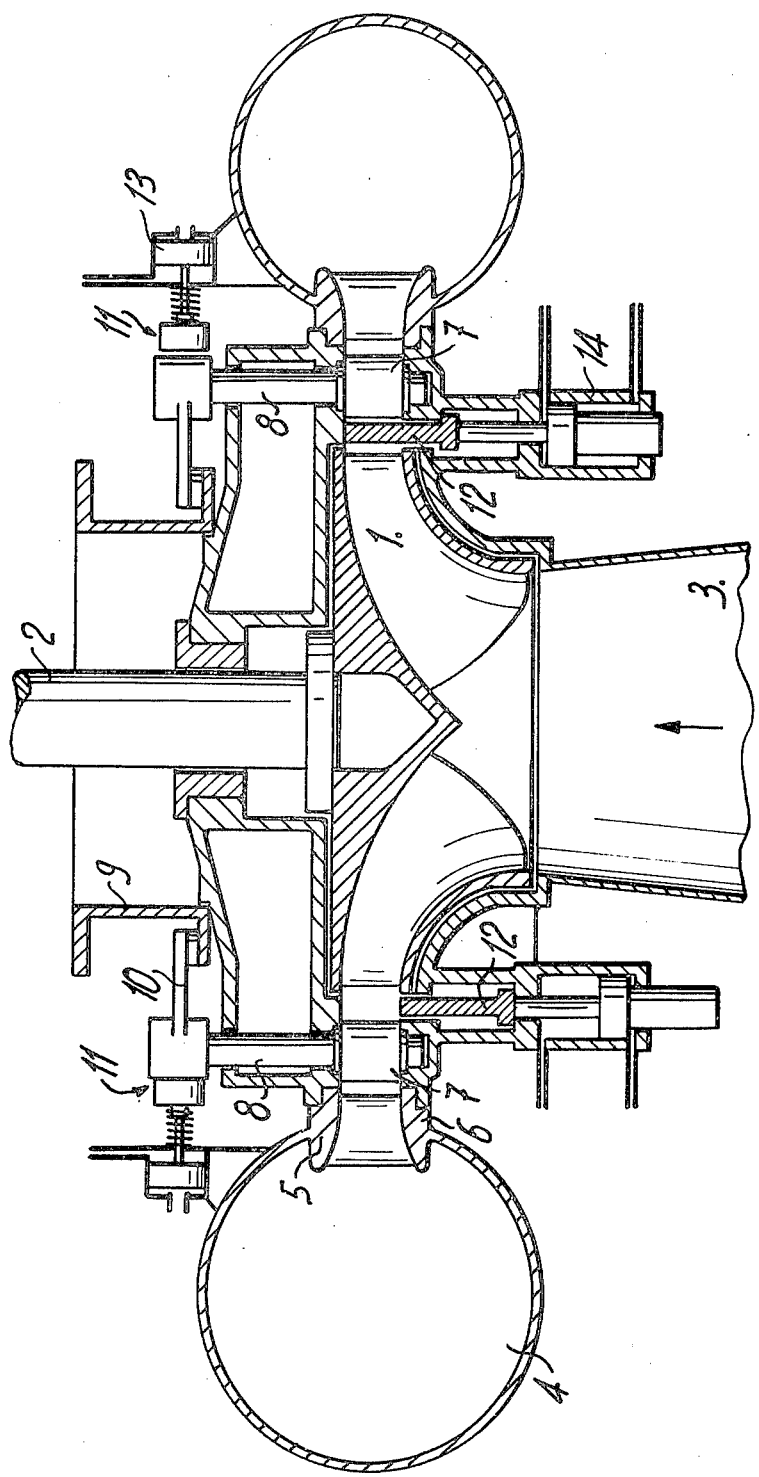

METHOD FOR ADJUSTING THE OUTPUT OF A PUMP PROVIDED WITH AN ADJUSTABLE SPRAY CONE WITH MOVABLE BLADES

Pumps provided with an adjustable spray cone having movable blades are well-known in the art. In hydraulic machines intended for the transfer of power through a reversible system including a pump and a turbine, the turbine carries a distributor with adjustable vanes or blades, which distributor forms a spray cone for the pumps when the machine is used for pumping purposes.

During the actual operation of the turbine, the liquid stream is subjected to an acceleration as it passes through the distributor of the turbine. Under such conditions, the throughput of the water entering the turbine can be adjusted readily without this leading to any inconvenience, the adjustment being performed by a modification in the angular setting of the guide-vanes without any interruption in the flow of incoming water.

During the pumping operation, in contradistinction, the liquid stream is subjected to a deceleration as it passes through the spray cone of the pump and, if it is attempted to adjust the output of the pump, during said pumping, by means of a modification of the angular setting of the movable blades without stopping the pump rotor, the blades start vibrating and the vibrations are transmitted to the whole machine and risk damaging the latter.

The present invention has for its object a method for adjusting the output of a pump provided with an adjustable spray cone having movable blades, without requiring any stopping in the drive of the pump rotor. This is achieved by setting the pump under still water conditions, through a closing of a gate or valve, inserted in the delivery channel of the pump, during the adjustment of the blades of the spray cone.

The invention covers furthermore an adjustable pump having movable blades and provided with a spray cone, said pump being adapted to operate in accordance with the above referred to method and including for this purpose a sleeve-shaped gate or valve inserted between the pump rotor and the spray cone.

The accompanying drawing illustrates diagrammatically and by way of example an embodiment of a pump according to the invention.

The single FIGURE of the drawing is an axial sectional view of a pump incorporated with a reversible turbine and pump system.

The machine illustrated includes an overhung wheel 1 carried at the lower end of a vertical shaft 2, over the input channel 3.

The rotor 1 lies in a plane extending substantially along the medial plane of the spiral casing 4 carried by two supporting annuli 5, 6 rigid respectively with the spray cone of the pump and with the turbine distributor whereof the movable blades 7 are pivotally carried by the spindles 8. A cylindrical gating 9 acts through the levers 10 on the spindles 8, so as to operate the blades 7, which latter are held in the selected position by a frictional locking system 11.

When the machine is operated as a turbine, it is sufficient, in order to adjust the angular setting of the blades 7 with a view to changing the amount of power produced, to release the spindles 8 through action on the locking system 13 and to shift the cylindrical gating 9 without switching off the intake of water into the pump rotor 1.

In contradistinction, when the machine is operated as a pump, it is necessary to set the pump under still water conditions whenever it is desired to adjust the throughout of the pump by acting on the blades 7. As illustrated on the right hand side of the drawing, the setting under still water conditions can be obtained by closing the sleeve valve 12 fitted between the rotor and the spray cone and which is shifted into its closed position before release of the spindles 8 carrying the blades 7 and actuation of the cylindrical gating 9.

When the adjustment of the blades 7 has been performed, the spindles 8 of the blades 7 are locked and the sleeve valve 12 is returned into its open position illustrated on the left hand side of the drawing.

In the embodiment illustrated, the frictional locking system for the blades 7 and the sleeve valve 12 are actuated by the corresponding hydraulic jacks 13, 14. It is of course, possible to actuate them through other suitable means, such as a mechanical control for instance.

Numerous modifications of the embodiment described may obviously be resorted to within the scope of the accompanying claims.

Thus, the sleeve valve 12 may be housed, for instance, between the movable blades 7 and the casing 4. It may, in fact, be entirely eliminated and be replaced by any suitable valve fitted in the channel with which the casing 4 is connected.

It should be noted that the sleeve valve 12, when closed, provides also means for a wholly reliable opening of the movable blade system, followed by an adjustment of the angular setting of the blades corresponding to the desired throughput and by a locking of the adjusted blades in the position obtained.

In the case of a fortuitous stopping of the drive of the pump rotor, it is possible to speedily close the sleeve valve of the pump without acting on the movable blades.

I claim:

1. A method for adjusting the output of a machine having a rotor which is operable both as a pump or turbine, said machine including a diffuser provided with normally locked movable directing blades and a sleeve valve, said method consisting of unlocking, adjusting and re-locking the angular setting of said blades to change the amount of power produced without shutting off the intake of water to said rotor when the machine is used as a turbine, and when said machine is used as a pump, said method consisting of driving said rotor, continuing the driving of said rotor preparatory to adjusting the output of said pump, closing fully said sleeve valve to put the pump under still water conditions, unlocking said movable directing blades without stopping the rotor, adjusting said blades to adjust the subsequent throughput of the pump, relocking said blades and then opening said sleeve valve to initiate the operation of an adjusted throughput of the pump.

* * * * *